US012752755B2

(12) United States Patent
Weh et al.

(10) Patent No.: US 12,752,755 B2

(45) Date of Patent: Oct. 6, 2026

(54) HYDRAULIC UNIT

(71) Applicant: Robert Bosch GmbH, Stuttgart (DE)

(72) Inventors: Andreas Weh, Sulzberg (DE); Johji Naka, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 583 days.

(21) Appl. No.: 18/299,224

(22) Filed: Apr. 12, 2023

(65) Prior Publication Data

US 2023/0406277 A1 Dec. 21, 2023

(30) Foreign Application Priority Data

Jun. 15, 2022 (DE) ..................... 10 2022 206 039.3

(51) Int. Cl.

*B60T 11/10* (2006.01)
*B60T 7/04* (2006.01)
*B60T 17/08* (2006.01)

(52) U.S. Cl.

CPC ............... *B60T 11/102* (2013.01); *B60T 7/04* (2013.01); *B60T 17/088* (2013.01)

(58) Field of Classification Search

CPC ... B60T 7/04; B60T 7/06; B60T 11/16; B60T 17/088; B60T 11/102

See application file for complete search history.

(56) References Cited

U.S. PATENT DOCUMENTS

| | | | | |
|---|---|---|---|---|
| 2,791,203 A * | 5/1957 | Ayers, Jr. | B60T 13/244 60/551 |
| 2,834,184 A * | 5/1958 | Ingres | B60T 13/244 92/99 |
| 4,796,958 A * | 1/1989 | Brown, Jr. | B60T 11/16 303/DIG. 10 |
| 6,322,284 B1 * | 11/2001 | Bonardo | F16D 25/08 285/376 |
| 8,225,920 B1 * | 7/2012 | Fredrick | F16D 25/12 192/115 |
| 2011/0132189 A1 * | 6/2011 | Fisher | B60T 17/088 92/161 |
| 2021/0053536 A1 * | 2/2021 | Ichiyanagi | B60T 13/161 |
| 2023/0406277 A1 * | 12/2023 | Weh | B60T 11/102 |
| 2024/0101078 A1 * | 3/2024 | Weh | B60T 7/06 |
| 2025/0108781 A1 * | 4/2025 | Weh | G05G 1/46 |

FOREIGN PATENT DOCUMENTS

| | | | |
|---|---|---|---|
| DE | 3001274 C2 * | 6/1992 | B62D 25/14 |
| DE | 102019216833 A1 | 5/2021 | |
| WO | 2013023953 A1 | 2/2013 | |

* cited by examiner

*Primary Examiner* — Thomas J Williams

(74) *Attorney, Agent, or Firm* — Norton Rose Fulbright US LLP

(57) ABSTRACT

A hydraulic unit of a hydraulic power brake system. The hydraulic unit includes a connecting plate for fastening the hydraulic unit to a bulkhead of a motor vehicle. The hydraulic unit additionally comprises an additional adapter plate which is adapted to connect the connecting plate to the bulkhead in order to at least partially establish a relative spatial arrangement of the hydraulic unit relative to the bulkhead.

7 Claims, 3 Drawing Sheets

HYDRAULIC UNIT

CROSS REFERENCE

The present application claims the benefit under 35 U.S.C. § 119 of German Patent Application No. DE 10 2022 206 039.3 filed on Jun. 15, 2022, which is expressly incorporated herein by reference in its entirety.

FIELD

The present invention relates to a hydraulic unit of a hydraulic power brake system.

BACKGROUND INFORMATION

PCT Patent Application No. WO 2013/023 953 A1 describes a hydraulic assembly for a slip-controlled, hydraulic vehicle power brake system. The hydraulic assembly includes a hydraulic block in which a master brake cylinder bore is disposed, in which a master brake cylinder piston is displaceably accommodated. Via a pedal rod that is connected to the master brake cylinder piston and to a foot brake pedal in articulated fashion, the master brake cylinder piston is displaceable in the master brake cylinder bore in order to generate a brake pressure.

German Patent Application No. DE 10 2019 216 833 A1 describes a hydraulic block for a hydraulic assembly of a hydraulic vehicle power brake system of a slip-controlled hydraulic vehicle power brake system. The hydraulic block includes a primary piston that protrudes from the hydraulic block and on which a pin-shaped signal transducer holder for a permanent magnet is disposed. The primary piston and the signal transducer holder are enclosed by a tubular housing which is formed as a cylindrical shell connected to two converging tangential walls.

An object of the present invention is to specify a hydraulic unit that can be adapted to customer-specific requirements with less effort and lower costs.

The object may be achieved by a hydraulic unit possessing the features of the present invention. Advantageous embodiments and developments of the present invention are disclosed herein.

SUMMARY

The present invention relates to a hydraulic unit of a hydraulic power brake system. According to an example embodiment of the present invention, the hydraulic unit comprises a connecting plate for attaching the hydraulic unit to a bulkhead of a motor vehicle, and an additional adapter plate which is adapted to connect the connecting plate with the bulkhead in order to at least partially establish a relative spatial arrangement of the hydraulic unit in relation to the bulkhead.

The present invention thus specifies an additional adapter plate. According to the present invention, the adapter plate is a component which can be selected independently of the remaining hydraulic unit. The remaining hydraulic unit can thereby be serially produced, making it unnecessary to take the mounting position and the attachment location on the bulkhead into account. This can reduce the costs of manufacturing the hydraulic unit. In addition, testing costs that would be necessary for a separately designed connecting plate are saved.

By way of a corresponding spatial orientation of the hydraulic unit in relation to the bulkhead, it is possible to comply with respective customer specifications regarding the position of the hydraulic unit, so that the hydraulic unit can be installed even in confined spaces. This makes the hydraulic unit versatile and economical to use.

In a preferred embodiment of the present invention, the adapter plate for attachment to the bulkhead comprises adapter plate fastening means (i.e., adapter plate fastening arrangement) arranged at a predetermined angle in relation to connecting means (i.e., connecting arrangement) for connection to the connecting plate, which can be used to set a rotation angle of the hydraulic unit in relation to the bulkhead. Adapter plate fastening means are understood to refer to all structural arrangements on the adapter plate that serve to fasten the adapter plate to the bulkhead. Such adapter plate fastening means can preferably be threaded bores through which the adapter plate can be fastened by screws of the bulkhead. In an alternative embodiment, the adapter plate fastening means are only through bores via which the adapter plate can be fastened to the bulkhead by screws of the bulkhead and additional nuts. Advantageously, the adapter plate fastening means themselves are screws which can be used to fasten the adapter plate to the bulkhead.

Connecting means are herein understood to refer to structural arrangements of the adapter plate which can be used to connect it to the connecting plate. These arrangements can also be configured as threaded bores, screws or bores. By providing an angle between the adapter plate fastening means and the connecting means, the hydraulic unit can be rotated relative to the bulkhead so that components of the hydraulic unit protruding beyond a housing of the hydraulic unit can be rotated according to an available installation space. The hydraulic unit can therefore be adapted to various requirements by simply adjusting the adapter plate.

In a further preferred embodiment of the present invention, the connecting means configured in the adapter plate for connecting to the connecting plate are configured as bores, wherein at least one bore is configured as an oblong hole so that the connecting plate can rotate to a limited extent in relation to the adapter plate. Depending on the number of connecting means, one connecting means is configured as a bore, while the remaining ones are configured as oblong holes. This permits limited rotation around a point so that rotation is still possible even during installation. In addition, the provision of oblong holes makes it possible to compensate for manufacturing tolerances, thereby avoiding laborious reworking of the adapter plate.

Advantageously, the adapter plate has a predetermined thickness by which a spacing with respect to the bulkhead can be set. By selecting the appropriate adapter plate thickness, the respective installation situation can be accommodated, so that the spacing with respect to the bulkhead can also be set using the adapter plate.

To set a tilt of the hydraulic unit in relation to the bulkhead, a side of the adapter plate facing the connecting plate and a side facing away from the connecting plate are preferably inclined towards each other at an angle of inclination. In other words, the side facing away from the connecting plate and the side facing the connecting plate are not parallel to each other. By orienting the two sides accordingly, the hydraulic unit can be tilted into any direction relative to the bulkhead. With a corresponding configuration of the adapter plate, there is a further option of spatially aligning the hydraulic unit so that it can be aligned according to the installation conditions for versatility in use.

In an advantageous further development of the present invention, the connecting means configured in the adapter plate for connecting to the connecting plate are configured as bores, wherein recesses are formed around the bores on a side of the adapter plate which faces away from the connecting plate. These recesses are preferably configured to receive a nut, for example. The nut does not project beyond the side facing away from the connecting plate. The connecting plate can thus be connected to the adapter plate without having to change the interface to the bulkhead.

Advantageously, the adapter plate comprises at least one opening via which the connecting plate with the adapter plate mounted thereon can be fastened to a housing of the hydraulic unit. The opening is configured such that connecting plate screws for connecting the connecting plate to the housing of the hydraulic unit are accessible from the hydraulic unit even when the adapter plate is already mounted. Accordingly, the connecting plate can be mounted as a unit together with the adapter plate on the housing of the hydraulic unit. Furthermore, when disassembling the connecting plate from the housing of the hydraulic unit, it is not necessary to disassemble the adapter plate first.

In a further advantageous embodiment of the present invention, a double-sided sealing adhesive tape or silicone bead is arranged between the adapter plate and the connecting plate to provide an outward seal. A sealed connection between the connecting plate and the adapter plate is easily made using double-sided sealing tape or a silicone bead.

According to one advantageous embodiment of the present invention, the adapter plate is connected to the connecting plate by a screw, clinch or rivet connection. These connections provide various options for connecting the adapter plate to the connecting plate, so that the option best suited to the respective requirements can be selected.

Exemplary embodiments of the present invention are shown in the figures and explained in further detail in the following description.

DETAILED DESCRIPTION OF EXAMPLE EMBODIMENTS

Figure 1:
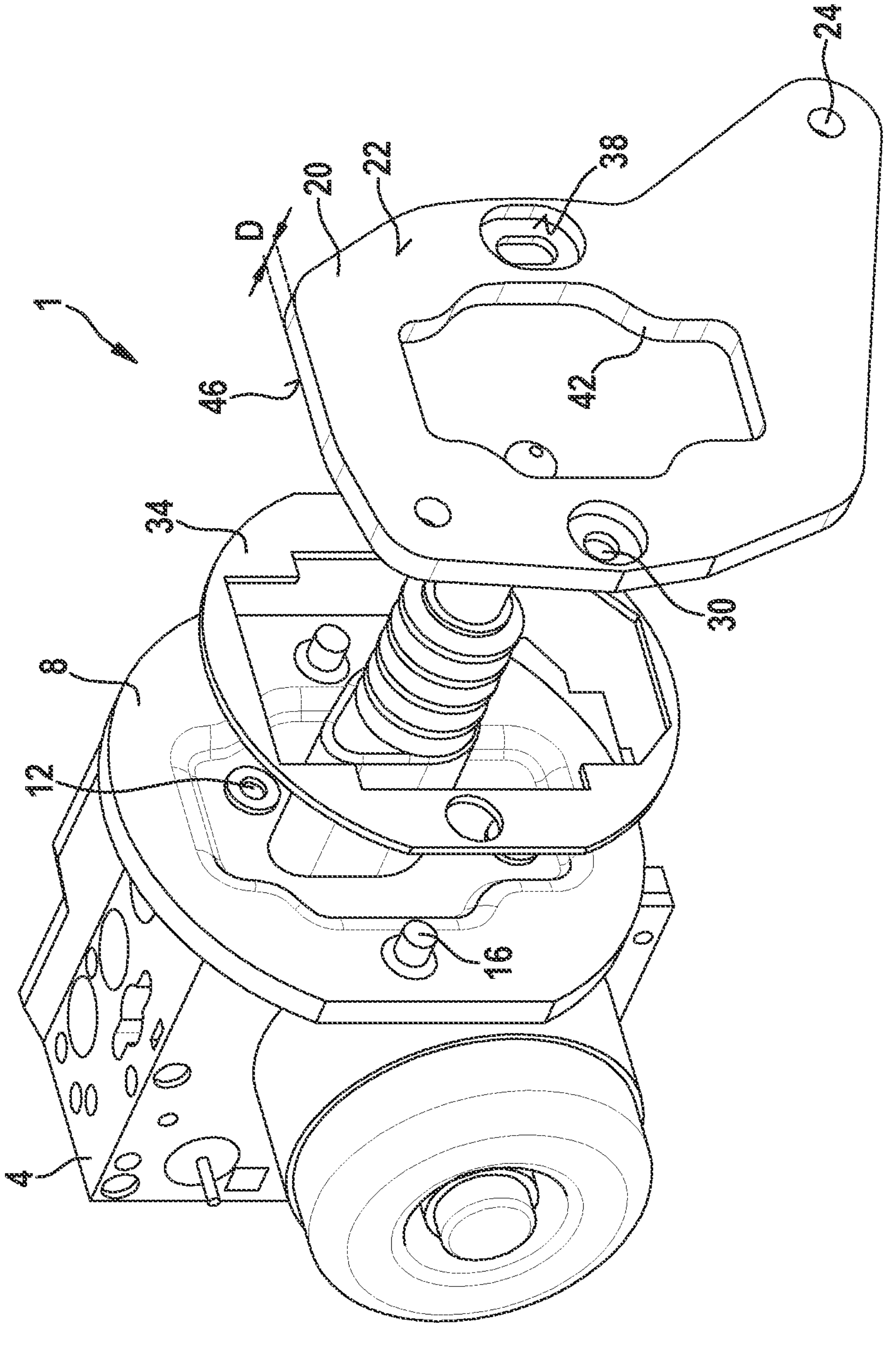
FIG. 1 shows a perspective view of the hydraulic unit according to a first exemplary embodiment of the present invention.

In FIG. 1, a perspective view of hydraulic unit 1 according to a first exemplary embodiment of the present invention is shown.

The hydraulic unit 1 herein comprises a cuboid housing 4, to which a connecting plate 8 is attached via connecting plate screws 12. The connecting plate 8 comprises two stud bolts 16, which may be threaded. The hydraulic unit 1 comprises an additional adapter plate 20. The adapter plate 20 comprises adapter plate fastening means 24, which are configured as threaded bores in this exemplary embodiment. The adapter plate can be connected to a bulkhead (not shown) of a motor vehicle via these adapter plate fastening means 24. The arrangement and position of the adapter plate fastening means 24 is selected according to the bulkhead attachment.

The adapter plate 20 additionally comprises two connecting means 30, which are configured as bores in this exemplary embodiment. One of these bores 30 is configured as an oblong hole, allowing for limited rotation of the adapter plate 20 in relation to the connecting plate 8 or for compensating for manufacturing tolerances. Via these bores 30, the adapter plate 20 is screwed to the stud bolts 16 of the connecting plate 8 with an intermediate layer of double-sided sealing adhesive tape 34. To attach a nut (not shown) between the adapter plate 20 and the bulkhead, the adapter plate 20 possesses recesses 38 around the bores 30 on a side 22 that faces away from the connecting plate 8.

The adapter plate 20 additionally comprises a centered opening 42 through which the connecting plate screws 12 of the connecting plate 8 can be detached from the cuboid housing 4 or fastened to the cuboid housing 4 while an adapter plate 20 is connected to the connecting plate. The connecting plate 8 and the adapter plate 20 can therefore be connected to the cuboid housing 4 as a unit. The adapter plate 20 additionally has a predetermined thickness D, which can be used to set a spacing to the bulkhead of the motor vehicle.

Figure 2:
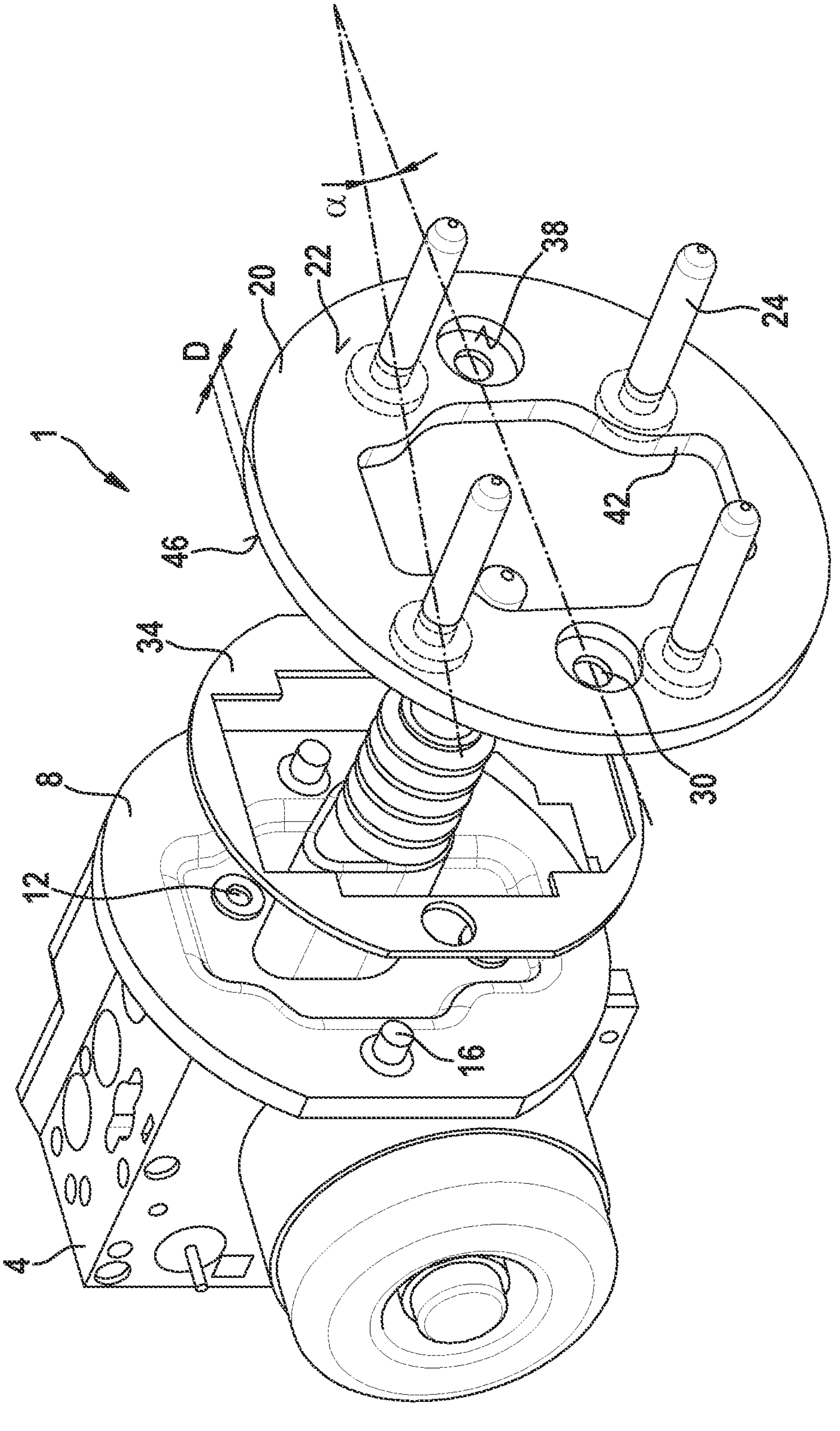
FIG. 2 shows a perspective view of the hydraulic unit according to a second exemplary embodiment of the present invention.

FIG. 2 shows a perspective view of the hydraulic unit 1 according to a second exemplary embodiment of the present invention. This exemplary embodiment differs from the exemplary embodiment shown in FIG. 1 in that the adapter plate fastening means 24 are not configured as threaded bores, but as four screws for connection to the bulkhead. In addition, these screws 24 have a predetermined angle $\alpha$ in relation to the connecting means 30 which are configured as bores. The hydraulic unit 1 is rotated with respect to the bulkhead at this angle $\alpha$. This angle $\alpha$ can be adjusted according to the required rotation. In this exemplary embodiment, in addition to rotation, the distance from the hydraulic unit 1 to the bulkhead can be set by adapting the thickness D of the adapter plate 20 accordingly.

Figure 3:
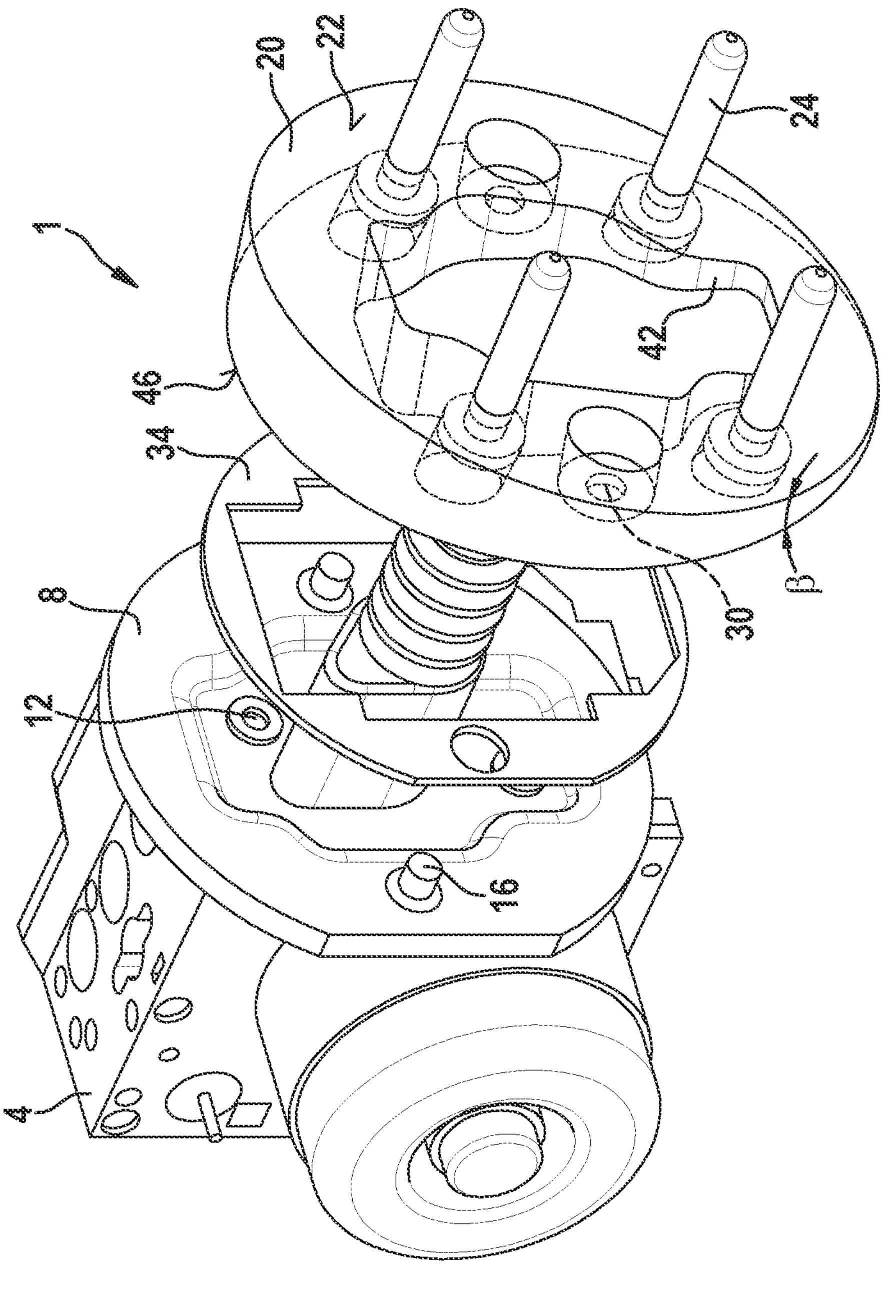
FIG. 3 shows a perspective view of the hydraulic unit according to a third exemplary embodiment of the present invention.

FIG. 3 shows a perspective view of the hydraulic unit 1 according to a third exemplary embodiment of the present invention. This exemplary embodiment differs from the second exemplary embodiment shown in FIG. 2 in that the thickness D of the adapter plate 20 is not constant. The side 22 which faces away from the connecting plate 8 has a predetermined inclination angle $\beta$, towards a side 46 which faces the connecting plate. The hydraulic unit 1 is inclined with respect to the bulkhead by this inclination angle $\beta$. The inclination angle $\beta$, can be adjusted to the required inclination by choosing the suitable adapter plate 20. It is also possible to adjust the spacing in relation to the bulkhead by additionally increasing the thickness D.

What is claimed is:

1. A hydraulic unit of a hydraulic power brake system, comprising:

a connecting plate configured to attach the hydraulic unit to a bulkhead of a motor vehicle; and an additional adapter plate configured to connect the connecting plate to the bulkhead to at least partially establish a relative spatial arrangement of the hydraulic unit relative to the bulkhead, wherein the adapter plate, for attachment to the bulkhead, includes an adapter plate fastening arrangement that is arranged at a predetermined angle relative to a connecting arrangement formed in the adapter plate for connection to the connecting plate, via which it is possible to set a rotation angle of the hydraulic unit in relation to the bulkhead, wherein the connecting arrangement formed in the adapter plate is configured as bores for connection to the connecting plate, wherein at least one bore of the bores is configured as an oblong hole, allowing the connecting plate to rotate to a limited degree in relation to the adapter plate, and wherein a side of the adapter plate facing the connecting plate and a side of the adapter plate facing away from the connecting plate have an inclination angle to each other to set a tilt of the hydraulic unit with respect to the bulkhead.

2. A hydraulic unit of a hydraulic power brake system, comprising:

a connecting plate configured to attach the hydraulic unit to a bulkhead of a motor vehicle; and an additional adapter plate configured to connect the connecting plate to the bulkhead to at least partially establish a relative spatial arrangement of the hydraulic unit relative to the bulkhead, wherein the adapter plate, for attachment to the bulkhead, includes an adapter plate fastening arrangement that is arranged at a predetermined angle relative to a connecting arrangement formed in the adapter plate for connection to the connecting plate, via which it is possible to set a rotation angle of the hydraulic unit in relation to the bulkhead, and wherein the connecting arrangement that is formed in the adapter plate is configured as bores for connecting to the connecting plate, wherein recesses are formed around the bores on a side of the adapter plate that faces away from the connecting plate.

3. The hydraulic unit according to claim 2, wherein the adapter plate has a predetermined thickness to set a spacing to the bulkhead.

4. The hydraulic unit according to claim 2, wherein the adapter plate includes at least one opening through which the connecting plate with the adapter plate mounted thereon can be fastened to a housing of the hydraulic unit.

5. The hydraulic unit according to claim 2, wherein the adapter plate is connected to the connecting plate by a screw or clinch or rivet connection.

6. A hydraulic unit of a hydraulic power brake system, comprising:

a connecting plate configured to attach the hydraulic unit to a bulkhead of a motor vehicle; and an additional adapter plate configured to connect the connecting plate to the bulkhead to at least partially establish a relative spatial arrangement of the hydraulic unit relative to the bulkhead, wherein the adapter plate, for attachment to the bulkhead, includes an adapter plate fastening arrangement that is arranged at a predetermined angle relative to a connecting arrangement formed in the adapter plate for connection to the connecting plate, via which it is possible to set a rotation angle of the hydraulic unit in relation to the bulkhead, wherein the connecting arrangement formed in the adapter plate is configured as bores for connection to the connecting plate, wherein at least one bore of the bores is configured as an oblong hole, allowing the connecting plate to rotate to a limited degree in relation to the adapter plate, and wherein double-sided sealing adhesive tape or a silicone bead is arranged between the adapter plate and the connecting plate to create an outward seal.

7. A motor vehicle, comprising:

a hydraulic unit of a hydraulic power brake system, including:

a connecting plate configured to attach the hydraulic unit to a bulkhead of the motor vehicle; and an additional adapter plate configured to connect the connecting plate to the bulkhead to at least partially establish a relative spatial arrangement of the hydraulic unit relative to the bulkhead, wherein the adapter plate, for attachment to the bulkhead, includes an adapter plate fastening arrangement that is arranged at a predetermined angle relative to a connecting arrangement formed in the adapter plate for connection to the connecting plate, via which it is possible to set a rotation angle of the hydraulic unit in relation to the bulkhead, and wherein the connecting arrangement formed in the adapter plate is configured as bores for connection to the connecting plate, wherein recesses are formed around the bores on a side of the adapter plate that faces away from the connecting plate.

* * * * *